Sept. 20, 1960     L. T. HAUGEN ET AL     2,953,398
PIPE JOINT
Filed May 28, 1956     3 Sheets-Sheet 1
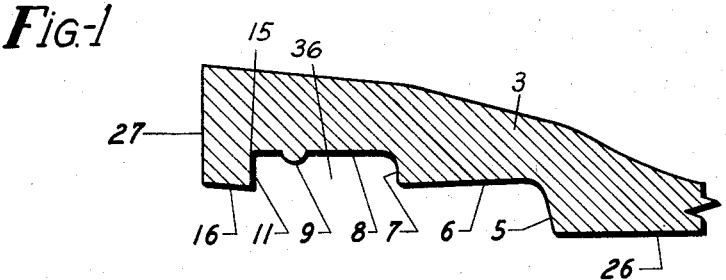
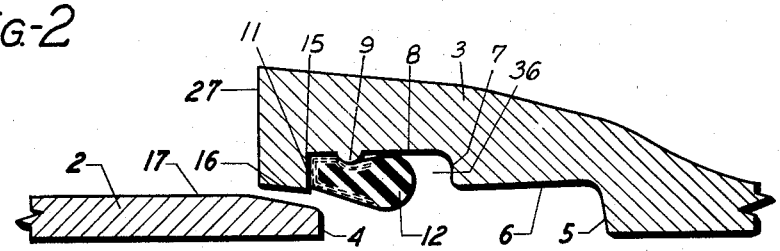
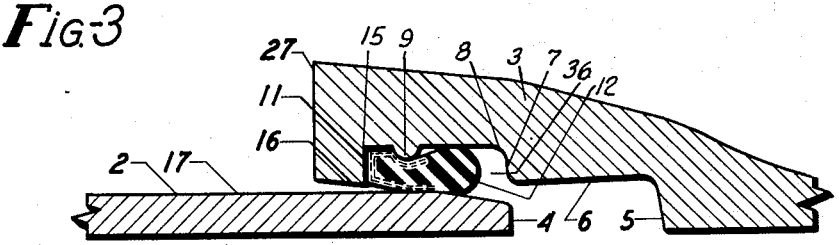
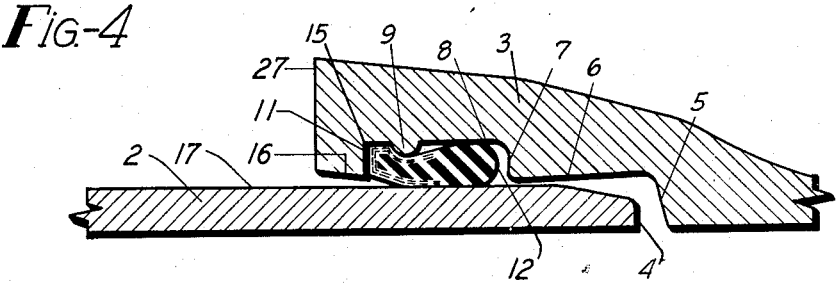
INVENTORS
Lawrence T. Haugen
Carl A. Henrikson
BY
Attorney Sept. 20, 1960  L. T. HAUGEN ET AL  2,953,398
PIPE JOINT
Filed May 28, 1956  3 Sheets-Sheet 2
FIG.5
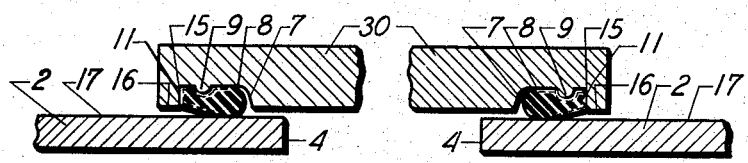
FIG.6
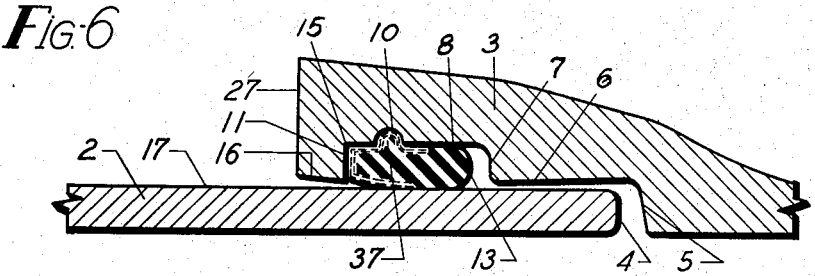
FIG.7
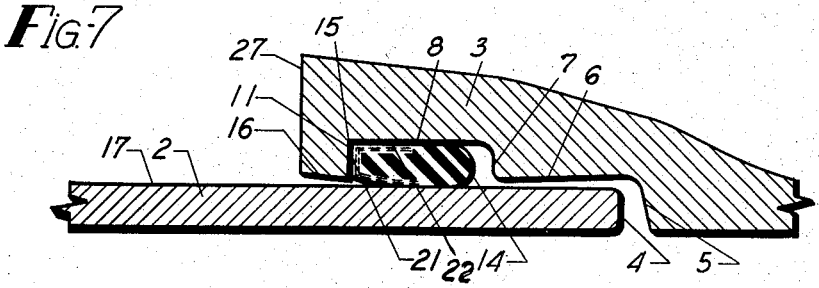
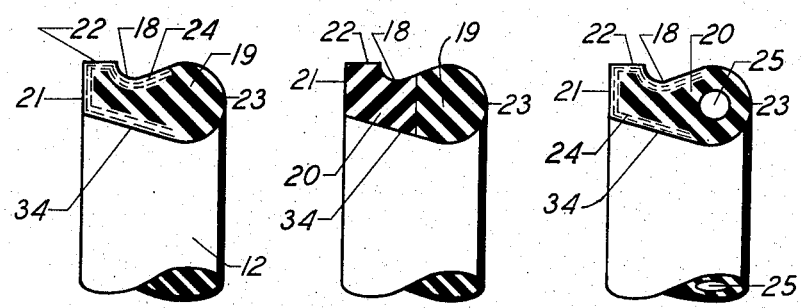
FIG.8   FIG.9   FIG.10
INVENTORS
Lawrence T. Haugen
Carl A. Henrikson
BY
Attorney Sept. 20, 1960   L. T. HAUGEN ET AL   2,953,398
PIPE JOINT Filed May 28, 1956   3 Sheets-Sheet 3

INVENTORS
Lawrence T. Haugen
Carl A. Henrikson
BY
Attorney

United States Patent Office 2,953,398
Patented Sept. 20, 1960

2,953,398
PIPE JOINT

Lawrence T. Haugen, Mountain Brook, and Carl A. Henrikson, Homewood, Ala., assignors to United States Pipe and Foundry Company, Birmingham, Ala., a corporation of New Jersey Filed May 28, 1956, Ser. No. 587,586

8 Claims. (Cl. 285—110)

This invention relates to joints and more particularly relates to pipe joints of the character used for connecting together sections of pipes, either of the bell and spigot type, or plain end pipe wherein a sleeve type coupling is utilized. The invention is applicable to pipes made of metal, ceramic material, concrete, cement-asbestos, plastic, or other compositions.

It is well known in the art to which the invention relates that difficulties have been encountered in providing a simple economical packing joint for bell and spigot or plain end pipe which would withstand any considerable pressure, and which would not impart rigidity to the pipe line in which it was employed. The joints most commonly employed for moderate pressures, such as found in city water mains, have been the lead caulked and sulfur compound joints, the same being a combination of jute or other fibrous material and lead, or sulfur compound, caulked or poured into the joint after it was laid. Where higher pressures are employed, it has been customary to resort to a bolted, or gland type, joint. The lead caulked or sulfur compound joint, while relatively inexpensive in material cost, involves considerable semi-skilled labor to install, while the bolted, or gland type of joint, is more expensive in first material cost and also involves considerable semi-skilled labor to install.

More recently attention has been directed toward the development of pipe joints not possessed of the disadvantages inherent in the more generally used lead caulked, sulfur compound, and bolted joints. Specifically, numerous attempts have been made by a number of investigators to develop a joint easily assembled in a minimum of time and with a minimum of expense. In general, such developments have been concentrated in the field of joints generically referred to as O ring joints, the name being derived from the use of annular gaskets, circular in cross section, seated in a groove between male and female pipe members. Such joints have in fact been developed, but not without the presentation of additional disadvantages and problems. The principal disadvantage arises from the fact that the use of such joints is limited to relatively low pressure pipe lines; application of even moderate pressure such as experienced in city water mains causing the O ring to blow out even between the relatively small space necessarily found between the telescoping pipe members.

Hydrostatic strength and resistance to frictional movement or blowout require gaskets having high deformation resistance. However, limited deformation resistance in the gaskets is required to permit assembly of the joints without excessive difficulty. These two considerations require gasket compromise between very close limits. The difficulties of the compromises involved is fully appreciated when one considers that the dimensions of the pipe ends and sleeve, or spigot end and bell seat as the case may be, may vary uncomplementarily within permitted tolerance limits, which are normally relatively wide, and that the situation may be aggravated by misalignment or deflection of the pipe ends by uneven trench conditions or other unfavorable conditions. The difficulties of effecting a satisfactory joint are further increased by the necessity for insuring against critical dislodgment of the gasket in two directions, since pipe lines may be subjected to line pressure reversals from positive to negative.

In the course of the investigations leading to the present invention it was discovered that reinforcing a portion of the gasket with material such as cotton duck fabric served to prevent the blowouts usually associated with this type of joint, but aggravated another problem, namely, gripping of the gasket by the plain pipe end during assembly and consequent removal of the gasket axially out of its intended sealing position in the groove, or distortion of the gasket from its natural and essential shape. Unless such a partially reinforced gasket is seated correctly in the groove, with the unreinforced or softer portion in sealing relation between the walls of the male and female pipe members and exposed to the internal pressure of the pipe line, an effective fluid tight joint is not assured. Further, if the unreinforced and softer portion is directed toward the entering portion of the socket, which may occur during assembly with an O ring gasket, flow of such softer portion may begin under pressure, again resulting in blowouts.

It is accordingly a principal object of this invention to provide a pipe joint construction or make-up which will be free from the noted objections applicable to joints as heretofore constructed.

Another object of the invention is to improve the construction of pipe joints of this character, to render them more economical to manufacture, and to facilitate the assembly of pipe sections including the joint without requiring skilled labor for this purpose.

Still another object is to overcome the difficulties of prior joints of the type noted above by providing a flexible pipe coupling of such type which resists fluid leakage and gasket blowouts or dislodgments under both positive and negative pressures, and at the same time requiring a minimum effort to assemble.

Other objects, and the characteristics and advantages of the invention, are further sufficiently explained in connection with the following detail description of the accompanying drawings, which show representative embodiments. After consideration of these examples, skilled persons will understand that many variations may be made without departing from the principles disclosed and we contemplate the employment of any structures that are properly within the scope of the appended claims.

In the drawings,

Figure 1 is a partial longitudinal section of a bell end of a pipe suitable for use with one embodiment of the invention;

Figure 2 is a partial longitudinal section of a bell and spigot pipe joint, embodying the invention, or the invention devices, in one form, in pre-assembly position;

Figure 3 is a similar view, but showing the joint partially assembled;

Figure 4 is a view similar to Figure 2, but with the joint completely assembled;

Figure 5 is a partial longitudinal section on a reduced scale of a sleeve-type pipe joint embodying features of this invention;

Figure 6 is a partial longitudinal section of a bell and spigot pipe joint illustrating another form of the invention, in assembled condition;

Figure 7 is a similar view of another form of the invention;

Figure 8 is a view, partly in cross section, showing the structure of the gasket such as illustrated in Figures 2, 3, 4 and 5;

Figures 9–15 are views of details of various other gaskets which may also be used in the joint comprising the invention.

Figure 11:
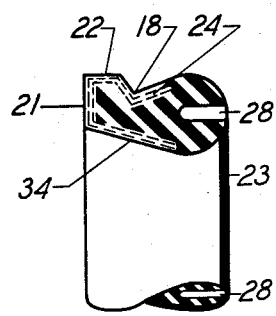

Referring more particularly to the drawings, Figures 1–4, and 16, inclusive, illustrate the application of the novel features of the invention to bell and spigot pipe joints in various stages of assembly. The bell end of the pipe includes an inner barrel 26 of approximately the same inner diameter as the inner diameter of the spigot end of the other pipe 2, included in the joint. Proceeding from the barrel 26, toward the outer end 27 of the bell there is provided in the bell portion a shoulder 5 which serves as an index during assembly. The spigot end of the pipe 2 inserted in the bell is stopped by shoulder 5, thus readily indicating to the workman that pipe 2 need be forced into the bell no further. Shoulder 5 is not, however, essential to the invention but is illustrated as a preferred embodiment.

The interior of the bell section 3 is provided with a generally cylindrical inner circumference 6 defining the opening for receiving spigot end 4 of inner pipe 2 which has a generally cylindrical outer wall 17. Formed radially within inner wall 6 is an annular groove 36 for reception of sealing gasket 12. The annular groove is defined by front radial wall 11, and rear radial wall 7, joined by a third wall 8 substantially axially parallel to barrel 26. Radial wall 11 is substantially perpendicular to axial wall 8 and the two walls form a juncture 15. Projecting inwardly of the wall 8 is an annular protrusion 9, the purpose of which will be later explained.

Before assembly of the pipe joint of this invention, a suitable annular gasket 12 is inserted into the annular groove with gasket wall 21 (Figure 8) in substantially continuous contact with front wall 11 of the groove. The gasket 12 is further constructed so that it may be flexed for entry, but due to its resiliency is readily forced to its normal circular shape upon entry so as to intimately engage axial wall 8 with its peripheral wall, but spaced from rear radial wall 7. In the preferred embodiment of the invention illustrated in Figures 2, 3 and 4, utilizing the gasket illustrated in Figure 8, an annular protrusion 9 is provided on axial wall 8 of the groove 36, and the gasket 12 inserted in the groove 36 is provided with a groove 18 complementary to protrusion 9 and adapted to fit thereover. A portion 22 of the gasket 12 projects between groove 18 and wall 21 to occupy the space between wall 11 of the bell groove and protrusion 9. The axial part of the gasket provided with complementary groove 18 is reinforced to provide resistance to deformation, so that upon insertion of spigot end 4 of the inner pipe member the gasket will not be displaced axially toward wall 7.

The specific embodiment illustrated in Figures 2, 3 and 4 represents but a preferred form of the invention, as will be obvious to those skilled in the art. Other means may be employed to serve the function of annular protrusion 9, although it has been found that the protrusion is most effective to position the gasket in its proper location against walls 8 and 11 of the groove 36 and spaced from wall 7. The protrusion can easily be cast into the groove when the bell is made from cast metal, e.g. cast iron. Figure 6 illustrates a different embodiment wherein the protrusion and groove are reversed, that is, where the protrusion 37 is a part of the gasket 13 and a complementary groove 10 is formed in axial wall 8. It will be apparent that the protrusion, whether on the pipe wall or gasket, need not necessarily be continuous, but may consist of a series of spaced apart protrusions arranged annularly. Likewise, the protrusions and grooves are not limited to the shapes illustrated, and may be located axially either closer to or more remote from juncture 15.

Still another means for accomplishing the desired result of preventing axial movement of the gasket during assembly is illustrated in Figure 7. In this specific embodiment the surface of wall 8 is not broken by either groove or protrusion, and no complementary structure is required on the gasket. In this form of the invention a suitable adhesive is applied either to radial wall 11 or axial wall 8 of the groove, or to the wall 21 or 22 of the gasket, or any combination of these surfaces, to seal the gasket in the desired position during assembly of the joint. For this purpose, the adhesive used need not necessarily be of a type to permanently seal the gasket to the groove, but any adhesive which effectively binds the gasket firmly in place during the relatively short period required for positioning the inner pipe member 2 in the bell 3 is sufficient. A combination of the different means may of course be used, such as, for example, adhesive applied to the structures also embodying the protrusion and groove means.

Figure 5 illustrates the application of the features of the invention to a sleeve-type joint or coupling. In the illustrated example, the spigot or inner pipe member is formed and designated the same as inner pipe section 2 in the bell and spigot illustrations. The grooves 36 formed in the sleeve 30 are shaped in cross-section similarly to the groove shown in the bell 3 of the bell and spigot joints previously described. In all essential features, i.e. means to secure the gasket in place during assembly, and gasket structure, the sleeve-type joint is identical to the bell and spigot joint, except that two grooves and two gaskets are of course required to effect a seal against each of the two spigot portions 2.

Of equal importance with the construction of the groove 36 in bell 3, to proper function of the joint of this invention, is the construction of the gasket to be seated in the groove. As will be readily apparent, the gasket must of necessity have a radial thickness for at least an axial part thereof greater than the distance between axial wall 8 of the groove in bell 3 and outer wall 17 of the spigot 2. This radial thickness is required in order for that portion of the gasket to be under radial compressive force between the two surfaces, thus effecting complete seal. For the same reason it will be apparent that such part of the gasket must be constructed of readily deformable and resilient material. It is equally as important that another axial portion of the gasket be constructed of more difficultly deformable material and that such portion have a radial thickness less than the distance between axial groove wall 8 of bell 3 and outer wall 17 of spigot 2. This portion of the gasket must be relatively rigid so as to resist the gasket being blown out of the opening between wall lip 16 of lip 37 and outer wall 17 of spigot 2. Otherwise, when internal pressure acts on the more elastic portion of the gasket, the force thereof could eventually force the gasket through the opening. A relatively rigid portion of the gasket is made to face the opening and the front radial wall 11, however, so that gasket blowout is rendered much more difficult. Utilization of a relatively rigid gasket part, however, tends to aggravate the problem of dislocation of the entire gasket from its proper location upon insertion of spigot end 4 into the bell opening. This problem is obviated in part by provision of means to resist axial movement of the gasket, such as annular protrusion 9 and corresponding annular groove 18 on axial wall 8 and gasket 12, respectively, or the other means previously discussed, but the effect of the spigot end 4 grasping and dislodging the gasket 12 can only be completely eliminated by providing a sufficiently large inside diameter of the gasket at this axial part so that the spigot end 4 only contacts a minimum portion of the relatively rigid axial part during movement therethrough. As previously mentioned, the gasket, when seated, is in contact with wall 8, so that with the lesser radial thickness specified the major part of the relatively rigid axial portion does not extend radially inward to fall within the path of the spigot end 4 during assembly. The major part of the gasket contacting the spigot end is thus the sealing part, namely, that part which is relatively easily deformable and which permits passage of spigot end 4, thus decreasing the tendency to dislocate the gasket axially.

Another critical feature of the gaskets useful in the joint comprising this invention is that they are elongated axially, i.e. the axial dimension, or length of the gasket, must exceed the greatest radial dimension, or thickness. This feature is required as a means of providing a low angle of incidence of pipe end 4 and the gasket in assembly, without the necessity for extreme gasket radial thicknesses. The angle of incidence referred to is the acute angle formed by wall 17 of the inner pipe member 2 and inner periphery 34 of gasket 12 at initial contact of the end 4 and the gasket. If the angle of incidence is excessively large the gasket does not deform to permit passage of end 4, but rather end 4 seizes the gasket and moves it axially or damages it. Aside from the problem of gasket blowouts, which can be controlled to a considerable extent by provision of reinforcement for a part of the gasket to impart rigidity, the O ring principle is effective as a means of sealing between inner and outer pipe members. But with O ring gaskets of reasonable sizes such as required for commercial usage in pipe joints, the angle of incidence is larger than for a gasket incorporating the critical feature referred to. Operable angles of incidence are consequently obtainable only through the use of O ring gaskets too large for serious consideration in connection with commercial pipe joints.

Through the use of the gaskets of our invention, however, the size of the gasket is maintained within reasonable limits and yet angles of incidence are obtainable comparable to those heretofore obtainable only through the use of O ring gaskets with diameters substantially greater.

The relative axial dimensions of the two parts of the gasket of different hardness characteristics can be varied somewhat consistent with the functions served by each axial part. That axial part of resilient and readily deformable material must in any case include all portions of the gasket exposed directly to internal pressure of the fluid carried by the pipe line in order to effect complete seal under all conditions. A substantial portion of the gasket under radial compressive forces between inner and outer pipe walls in assembled condition must likewise be of resilient and readily deformable material. On the other hand the axial part more resistant to deformation must extend, along the outside wall, from the end wall 21 thereof toward the opposite extremity at least as far as the means cooperating between the gasket and groove walls to prevent axial movement of translation of the gasket during assembly. Further, this latter axial part must extend along inner wall 34 for a distance to insure that only relatively harder gasket material is exposed to the opening between axial wall 16 of lip 37 and pipe surface 17. Since any flow of the gasket through this opening would take approximately a semi-circular cross sectional shape, it can be stated generally that the axial part of the gasket which must be relatively resistant to deformation must include a surface measured along inner wall 34 for a distance greater than one and a half times the radial distance between lip wall 16 and pipe wall 17, measured as an extension of groove wall 11. With respect to the volume which must be occupied by the part more resistant to deformation, it will be apparent from what has been said that substantially all of the space defined by the axial extent of such part, e.g. axially from face 21 of the gasket to the beginning of softer part 23, and between axially extending wall 8 of the outer pipe section and outer wall 17 of inner pipe section 2, must be filled by such part. Any of such space not so filled, however, must be substantially less than the volume occupied by the sealing, or more deformable part of the gasket.

Consistent with the requirements described above, the gaskets useful in the joint of this invention can vary widely as to shape and structure. The drawings illustrate but a few of many operable forms and shapes of gaskets and those illustrated are intended as representative only and not by way of limitation. In general, any gasket can be used which is elongated axially, and is comprised of two axial parts, one part being constructed of resilient and readily deformable material capable of sealing the joint and the other part being constructed of relatively rigid material, capable of withstanding blowout i.e. material relatively more resistant to deformation. Preferably, the maximum outside diameters of the two axial parts are substantially the same, while as will be obvious from what has been said the inside diameter of the gasket tapers from a maximum at the side thereof adjacent wall 21 to a minimum at the other side thereof.

In the preferred gasket structures illustrated in Figures 8 and 10–15, rigidity is imparted to that portion seated adjacent wall 11 by imbedding therein a suitable reinforcing material 24, such as textile fabric, metal screening, metal sheet, plastic, etc. It has been found that cotton duck incorporated in this portion of the gasket structure serves satisfactorily to prevent extrusion out of the bell cavity by internal pressure, and additionally, serves to impart sufficient rigidity to resist axial movement over protrusion 9 during assembly. In a gasket structure of this type, wherein rigidity is imparted through reinforcement, the choice of a suitable material of construction depends primarily on suitability for the sealing portion of greater radial thickness. It has been found that rubber, synthetic rubber, or any suitable resilient and readily deformable plastic material having a Shore "A" durometer hardness between about 40 and 65 can be used for this purpose. Sufficient reinforcing material is incorporated in the thinner axial part to achieve a hardness between about 75 and 90.

In order to still further increase the resiliency and deformation characteristics of the axial part of the gasket of greater radial thickness, without a corresponding effect on the desired degree of rigidity of the other part, it has been found in some instances desirable to break the continuity of the material of construction of the thicker part. Figure 10 illustrates one structure suitable to accomplish this purpose, wherein a continuous annular hole 25 is formed substantially in the center of the thicker part of the gasket. It will be apparent to those skilled in the art that the air within the hole 25 permits greater distortion of that gasket part to permit passage of the spigot end 4 during assembly.

Figure 12:
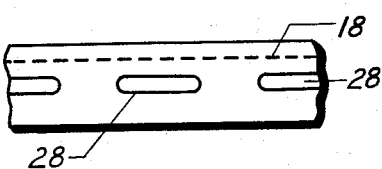

Figures 11 and 12 illustrate another form of gasket in which a series of spaced apart holes 28 are provided axially in the part of the gasket of greater thickness. These holes likewise serve the purpose of rendering that portion of the gasket more easily deformed to permit ready passage of spigot end 4 during assembly. The holes serve the additional purpose of distributing the internal pressure from the pipe radially to the gasket, thus increasing the compressive forces acting to seal the gasket between the pipe walls.

Figure 13:
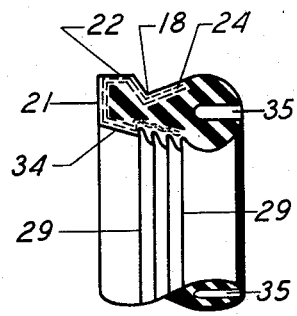
Figure 14:
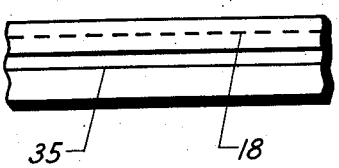

Figures 13 and 14 illustrate still another gasket structure provided with annular ridges 29 which are even more readily deformable to permit passage of spigot end 4 during assembly, and also provided with a continuous slot 35 to serve the purpose of spaced holes 28 in Figures 11 and 12.

Figure 15:
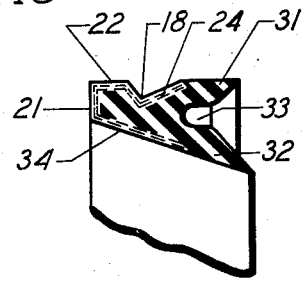
Figure 16:
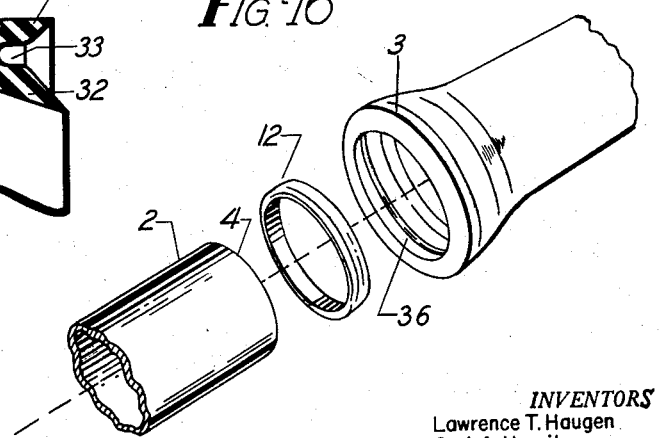
Figure 16 is an exploded perspective view illustrating all essential parts for assembly of a pipe joint embodying features of the invention.

Still another suitable gasket structure is illustrated in Figure 15. In that embodiment illustrated the relatively rigid part of the gasket of lesser thickness is substantially identical to the gaskets previously discussed, but the resilient part of greater radial thickness differs. Spaced apart lips 31 and 32 are provided to effect sealing contact with axial wall 8 and spigot outer wall 17, separated adjacent their juncture by annular groove 33. Like the spaced holes 28 in Figures 11 and 12 or the annular slot 35 in Figures 13 and 14, this annular groove 33 is adapted to receive internal pressure from within the pipe barrel and apply it as radial pressure to effect a tight seal of lip 31 against axial wall 8 and lip 32 against outer wall 17.

In Figure 9 there is illustrated still another type of gasket construction, yet maintaining the essential features of gaskets useful in the new pipe joint comprising the invention. In the gasket illustrated no reinforcing material is imbedded in the part 20 of the gasket of lesser radial thickness, but rather this part of the gasket is constructed of relatively rigid material, such as rubber having a Shore "A" durometer hardness of about 75 to 90. The other axial part 19 of the gasket is constructed of resilient material having a Shore "A" durometer hardness between about 40 and 65, and the two axial parts are integrally bonded together to form a one-piece annular gasket. This type structure can also be varied so as to provide discontinuities such as illustrated in Figures 10, 11, 12, 13, 14 and 15.

The clearance between outer wall 17 of the spigot end of pipe 2 and lip wall 16 of the bell is only such as to permit easy insertion of the spigot end into the bell, allowing for reasonable deflection, and is sufficiently close that the relatively rigid portion of gasket 12 will not blow out due to pressures within the pipe. It will be apparent that greater tolerances as to this clearance are permissible with the gaskets comprising a part of this invention, due to the provision of the relatively rigid part of the gasket adjacent the clearance.

The manner in which the novel features of the new pipe coupling of this invention function to produce the advantages sought will be more clearly understood from a description of the method of assembly and the operation under line pressure. Referring again to Figures 1, 2, 3 and 4, and to Figure 16, the outer wall 17 of inner pipe section 2 or the inner wall 34 of the gasket 12, may, if desired, be coated with a suitable lubricant, e.g. soft soap. The desirability of lubricating, and the extent, is determined by the roughness of the surface of wall 17, and the shape of the extreme end 4 of spigot 2 which in turn further affects the angle of incidence. If sufficient taper is provided to the spigot end 4, as shown in Figure 2, or if the inner pipe member 2 is constructed of a material to give a smooth surface to outer wall 17, little or no lubricant may be required. In any event, even with rough surfaces and non-tapered ends such as shown in Figures 5, 6 and 7, a small amount of lubricant applied to the gasket is usually sufficient. The lubricant is preferably applied after insertion of the gasket 12 into its proper seat, as illustrated in Figure 2. The workman need only ascertain that wall 21 of the gasket is in contact with wall 11 of the groove seat and returned to its original circular shape, which automatically assures contact with axial wall 8 and operation of the means to prevent movement of the gasket. If an adhesive is utilized as the means to prevent axial gasket movement, it is of course applied prior to insertion of the gasket.

The outer pipe section, be it the bell end of a pipe or a sleeve, is then fully prepared for insertion of inner pipe section or spigot end 4 into the outer pipe opening. In all previous joints of this general type, there existed a marked tendency for spigot end 4 to frictionally engage the gasket upon contact, and move the gasket axially in the groove. In many instances this axial movement did not cease when the gasket engaged the rear wall 7 of the groove, but at this point the gasket became twisted, pinched or otherwise distorted, and was forced between wall 6 of the outer pipe section and the spigot end. When this movement occurred actual damage to the gasket could be expected. The defect might not be detected until pressure is applied to the line and a leak observed. As previously pointed out, however, the joint of this invention is designed to eliminate this difficulty. Means are provided to secure the gasket against any axial movement relative to the groove, assuring a leak proof joint in every case.

Inasmuch as the spigot end essentially contacts only the axial part of the gasket which accomplishes sealing, and this part of the gasket is constructed of resilient and readily deformable plastic material, the gasket is compressed radially upon contact with end 4 of inner pipe member 2 and offers very little resistance to axial movement of the pipe end 4. In fact, one of the distinguishing features of the joint is the small amount of force required to insert the inner pipe member in the outer pipe member or bell.

No additional steps of assembly are required after the spigot is inserted in the bell, and the line is then ready for reception of internal pressure. The pressure is applied from the pipe line against the resilient portion of the gasket not in contact with the opposing pipe walls. The resultant force is directed axially against the gasket, and in prior joints of this general type effected flow of the gasket out of the clearance between lip wall 16 and outer wall 17 of inner pipe section 2, the time required for such blowout being dependent to a considerable extent on the size of the opening, thus necessitating closer tolerances. In the gaskets employed in this invention, however, that part of the gasket adjacent this opening is resistant to deformation and so cannot flow through the space, even if such space is relatively large.

An unexpected advantage of the joint structure of the invention has been found to result from the provision of the means provided to secure the gasket against axial movement in the groove during assembly. Tests with joints constructed in accordance with the invention, but without such means, proved that even when correct assembly is effected the gasket will blow out the opening under relatively high pressures. Blowout occurs because of complete reversal of the gasket in the groove, the more resilient portion passing under the more rigid part and out of the opening. The elongated shape of the gasket provides some resistance to reversal. This reversal requires, further, that the more rigid part move axially away from the opening as the resilient part starts to flow toward and through the opening. Provision of the means comprising annular protrusion 9 and corresponding gasket groove 18 serves to prevent gasket reversal and blowout because required axial movement of the relatively rigid gasket portion is prevented.

While the invention is shown in several forms, it will be obvious to those skilled in the art that it is not so limited, but is susceptible of various other changes and modifications, without departing from the spirit thereof, and we desire, therefore, that only such limitations shall be placed thereon as are imposed by the prior art and as are specifically set forth in the appended claims.

Another form of this invention, in which the only difference is in the gasket structure, is shown in copending application Serial No. 649,746, filed April 1, 1957, by the same inventors as a continuation-in-part of this application. In the form therein illustrated and described, both axial parts of the gasket are constructed of identical material having a Shore "A" durometer hardness between about 50 and 70.

We claim:

1. A pipe joint comprising an inner pipe telescoped within an outer pipe, an annular lip on one end of the outer pipe extending toward said inner pipe and having an internal radius slightly greater than the external radius of said inner pipe thereby to define a radial clearance between said lip and said inner pipe, said outer pipe having an axially elongated annular groove in its inner wall radially opposite said inner pipe, said groove being defined by a generally axially extending wall, and on one axial end by a generally radially extending inner wall of said lip, and on the opposite end by a generally radially extending opposite wall, an axially elongated annular integral gasket fitted in said elongated groove and having a holding part located in said elongated groove axially adjacent the said lip and a sealing part located in said groove axially remote from the lip, the inside diameter of the gasket decreasing from a maximum on the said holding part to a minimum on said sealing part, the sealing part of said gasket having a portion thereof in engagement with the axially extending wall of said groove and the outer wall of said inner pipe under radial compressive force whereby a seal is effected, said holding part having an inside diameter adjacent the inner wall of the lip greater than the outside diameter of said inner pipe and tapering inwardly, the volume of said holding part under radial compressive force being less than the volume of said sealing part under radial compressive force, and a ridge and groove retaining means cooperating between said holding part of the gasket and the said axially extending wall of said elongated groove for holding the gasket against axial movement during assembly of the joint, there being an annular space axially inward of said elongated groove into which the end of said inner pipe projects, said space having a portion with a diameter less than the smallest diameter of the said axially extending wall of said elongated groove.

2. A pipe joint comprising an inner pipe telescoped with an outer pipe, an annular lip on one end of the outer pipe extending toward said inner pipe and having an internal radius slightly greater than the external radius of said inner pipe thereby to define a radial clearance between said lip and said inner pipe, said outer pipe having an axially elongated annular groove in its inner wall radially opposite said inner pipe, said groove being defined by a generally axially extending wall, and on one axial end by a generally radially extending inner wall of said lip, and on the opposite end by a generally radially extending opposite wall, an axially elongated annular integral gasket fitted in said elongated groove and having a holding part located in said groove axially adjacent the said lip and a sealing part located in said groove axially remote from the lip, the inside diameter of the gasket decreasing from a maximum on the said holding part to a minimum on said sealing part, the sealing part of said gasket having a portion thereof in engagement with the axially extending wall of said groove and the outer wall of said inner pipe under radial compressive force whereby a seal is effected, said sealing part being more readily deformable than the said holding part, said holding part being sufficiently deformable and resilient to permit insertion of the gasket in said elongated groove and having an inside diameter adjacent the inner wall of the lip greater than the outside diameter of said inner pipe and tapering inwardly, the volume of said holding part under radial compressive force being less than the volume of said sealing part under radial compressive force, said holding part extending along its inner surface a distance at least one and a half times the dimension of said clearance, and a ridge and groove retaining means cooperating between said holding part of the gasket and the said axially extending wall of said elongated groove to hold the said gasket against axial movement during assembly of the joint, there being an annular space axially inward of said elongated groove into which the end of said inner pipe projects, said space having a portion with a diameter less than the smallest diameter of the said axially extending wall of said elongated groove.

3. A pipe joint comprising an inner pipe telescoped within an outer pipe, an annular lip on one end of the outer pipe extending toward said inner pipe and having an internal radius slightly greater than the external radius of said inner pipe thereby to define a radial clearance between said lip and said inner pipe, said outer pipe having an axially elongated annular groove in its inner wall radially opposite said inner pipe, said groove being defined by a generally axially extending wall, and on one axial end by a generally radially extending inner wall of said lip, and on the opposite end by a generally radially extending opposite wall, an axially elongated annular integral gasket fitted in said elongated groove and having a holding part located in said groove axially adjacent the said lip and a sealing part located in said groove axially remote from the lip, the inside diameter of the gasket decreasing from a maximum on the said holding part to a minimum on said sealing part, the sealing part of said gasket having a portion thereof in engagement with the axially extending wall of said groove and the outer wall of said inner pipe under radial compressive force whereby a seal is effected, said sealing part being more readily deformable than the said holding part, said holding part being sufficiently deformable and resilient to permit insertion of the gasket in said elongated groove and having an inside diameter adjacent the inner wall of the lip greater than the outside diameter of said inner pipe and tapering inwardly, the volume of said holding part under radial compressive force being less than the volume of said sealing part under radial compressive force, said holding part extending along its inner surface a distance at least one and a half times the dimension of said clearance, and an annular retaining ridge projecting radially inward from the axially extending wall of said elongated groove and a cooperating groove at least part of which is in the said holding part of the gasket for holding the gasket against axial movement during assembly of the joint, there being an annular space axially inward of said elongated groove into which the end of said inner pipe projects, said space having a portion with a diameter less than the smallest diameter of the said axially extending wall of said elongated groove.

4. A pipe joint as defined in claim 1 in which the said sealing part of said gasket is constructed of a material having a Shore "A" durometer hardness between about 40 and 65 and said holding part of said gasket is constructed of a material having a Shore "A" durometer hardness between about 75 and 90.

5. A pipe joint comprising, in combination an inner pipe section having an end portion of generally cylindrical outer circumference, an outer pipe section having a generally cylindrical inner circumference defining an opening receiving said end portion of said inner pipe section, said outer pipe section having an axially elongated annular groove in its inner wall radially opposite said inner pipe section, said groove being defined on its axial end adjacent the said opening by the internal wall of a lip extending toward the said inner pipe section and being further defined by a substantially axially extending wall portion and on its axial end remote from said opening by a second wall extending toward said inner pipe section, the diameter of the said lip at its inner extremity being slightly greater than the external diameter of said inner pipe section, an annular space on the axial side of said groove remote from said lip into which said inner pipe section projects, said space having a portion with a diameter less than the diameter of the said axially extending wall portion of the groove, an axially elongated annular gasket having two axial parts both of which are fitted in said groove, a first axial part of said gasket having at least a portion thereof in engagement with the axially extending wall of said groove and the outer wall of said inner pipe section under radial compressive force whereby a seal is effected between said outer and said inner pipe sections, the other axial part of said gasket being positioned axially adjacent said opening and having an inside diameter tapering inwardly from a maximum greater than the outside diameter of said inner pipe section, and means cooperating between said other axial part and an adjacent wall of said groove for securing said gasket against axial movement of translation relative to said groove during assembly of said joint.

6. A pipe joint as defined in claim 5 in which an annular protrusion on the axially extending wall portion of said groove and a corresponding annular groove in the outer wall of the said other axial part of said gasket constitute the means for securing said gasket against axial movement of translation.

7. A pipe joint as defined in claim 5 in which a smaller annular groove in the axially extending wall portion of said groove and a corresponding protrusion on the outer wall of the said other axial part of said gasket constitute the means for securing said gasket against axial movement of translation.

8. A pipe joint comprising, in combination, an inner pipe section having an end portion of generally cylindrical outer circumference, an outer pipe section having a generally cylindrical inner circumference defining an opening receiving said end portion of said inner pipe section, said outer pipe section having an axially elongated annular groove in its inner wall radially opposite said inner pipe section, said groove being defined on its axial end adjacent the said opening by the internal wall of a lip extending toward the said inner pipe section and being further defined by a substantially axially extending wall portion and on its axial end remote from said opening by a second wall extending toward said inner pipe section, the diameter of the said lip at its inner extremity being slightly greater than the external diameter of said inner pipe section, an annular space on the axial side of said groove remote from said lip into which said inner pipe section projects, said space having a portion with a diameter less than the diameter of any portion of the said axially extending wall portion, an axially elongated annular gasket having two axial parts both of which are fitted in said groove, a first axial part of said gasket having at least a portion thereof in engagement with the axially extending wall of said groove and the outer wall of said inner pipe section under radial compressive force whereby a seal is effected between said outer and said inner pipe sections, said first axial part being more readily deformable than the other axial part of said gasket, said other axial part being positioned axially adjacent said opening and having an inside diameter tapering inwardly from a maximum greater than the outside diameter of said inner pipe section, said other axial part being constructed of material sufficiently deformable to permit entry of said gasket through said opening and sufficiently resilient to permit return to its original shape, and means cooperating between said other axial part and an adjacent wall of said groove for securing said gasket against axial movement of translation relative to said groove during assembly of said joint.

References Cited in the file of this patent

UNITED STATES PATENTS

| | | |
|---|---|---|
| 1,608,197 | Bille | Nov. 23, 1926 |
| 2,059,775 | Clark | Nov. 3, 1936 |
| 2,116,705 | Marx | May 10, 1938 |
| 2,230,725 | Nathan | Feb. 4, 1941 |
| 2,245,154 | McWane | June 10, 1941 |
| 2,271,936 | Carson | Feb. 3, 1942 |
| 2,272,811 | Nathan | Feb. 10, 1942 |
| 2,323,482 | Merrill | July 6, 1943 |
| 2,620,206 | Cornelius | Dec. 2, 1952 |

OTHER REFERENCES

Vanderbilt: 1948 Rubber Handbook, pages 157, 161, 166, 194 and 195.